United States Patent

Downey

[15] 3,699,189
[45] Oct. 17, 1972

[54] POLYESTER-VINYL CHLORIDE COPOLYMER ADHESIVE

[72] Inventor: Raymond E. Downey, Akron, Ohio

[73] Assignee: The Goodyear Tire & Rubber Company, Akron, Ohio

[22] Filed: Nov. 10, 1969

[21] Appl. No.: 875,577

[52] U.S. Cl.............260/873, 117/161 K, 161/232, 161/250, 161/252, 260/31.6, 260/31.8 G, 260/31.8 M
[51] Int. Cl.....B32b 27/08, B32b 27/10, C08g 39/10
[58] Field of Search..........260/873, 31.6; 117/161 K; 161/231, 247

[56] References Cited

UNITED STATES PATENTS

| | | |
|---|---|---|
| 3,382,295 | 5/1968 | Taylor et al. ..............260/860 |
| 3,501,554 | 3/1970 | Aylesworth et al.......260/31.6 |
| 3,520,844 | 7/1970 | Pontius......................260/873 |
| 3,374,137 | 3/1968 | Wiener......................161/232 |

FOREIGN PATENTS OR APPLICATIONS

| | | |
|---|---|---|
| 599,523 | 3/1948 | Great Britain.............260/873 |
| 1,105,620 | 3/1968 | Great Britain.............260/873 |

*Primary Examiner*—William H. Short
*Assistant Examiner*—Edward Woodberry
*Attorney*—F. W. Brunner and Hubert A. Pattison, Jr.

[57] ABSTRACT

A laminating adhesive is claimed containing a copolyester of 10 to 30 parts sebacic acid, 40 to 70 parts of terephthalic acid, 20 to 40 parts of neopentyl glycol and 40 to 70 parts of ethylene glycol in admixture with 50 to 150 parts of vinyl chloride/vinyl acetate copolymer, about 5 to 40 parts of a plasticizer together with a mixed aromatic-ketone solvent.

2 Claims, No Drawings

POLYESTER-VINYL CHLORIDE COPOLYMER ADHESIVE

This invention relates to laminating protective films to wood and other substrates. More particularly the invention comprises a laminating adhesive for polyvinyl chloride and wood comprising a copolyester of sebacic acid, terephthalic acid, neopentyl glycol and ethylene glycol in admixture with 50 to 150 parts of vinyl chloride/vinyl acetate copolymer (i.e. PVC/PVAC copolymer), 5 to 40 parts of a plasticizer such as di-octyl phthalate together with a mixed aromatic-ketone solvent.

In order to more fully describe the present invention, the following experimental data are given:

| Formulations | A | B | C |
| --- | --- | --- | --- |
| Copolyester | 100 | 80 | 100 |
| PVC/PVAC Resin (VMCH Union Carbide) | 100 | 100 | 80 |
| Di-octyl phthalate | 22 | 30 | 15 |
| Toluene | 228 | 216 | 200 |
| Xylene | 171 | 162 | 150 |
| Acetone | 171 | 162 | 150 |

The range of vinyl chloride to vinyl acetate which may be used in the copolymer is 85 to 95 percent of former to 5 to 15 percent of the latter.

The copolyester used in the above example contained units from ethylene glycol and units from neopentyl glycol in the ratio of 56/44 and units from terephthalic acid and sebacic acid in the ratio of 71/29.

The example illustrates the invention with respect to the use of a specific copolyester of sebacic acid, terephthalic acid, ethylene glycol and neopentyl glycol. Such resins of a range of compositions can be used. For example the ethylene glycol units can range from 40 to 60 percent of the total glycol units; the neopentyl glycol units can range from 60 to 40 percent of the total; the terephthalic acid units can range from 20 to 75 percent of the total acid units and the sebacic acid units can range from 80 to 25 percent of the total acid units.

Other copolyester resins can be used in place of the ethylene glycol-neopentyl glycol-terephthalate sebacate copolyester used in the example. Representative examples of such copolyesters are ethylene-neopentyl terephthalate isophthalate copolyesters in which the ratio of ethylene glycol units to neopentyl glycol units is in the range of 40/60 to 60/40 and the terephthalic acid units and isophthalic acid units in the copolyester are present in the range of 95/5 to 50/50 and tetramethylene-terephthalate isophthalate sebacate copolyesters in which the units of the acids are present in the range of 20 to 50 of terephthalic units to 5 to 50 of isophthalic units and 50 to 20 percent of sebacic units.

Instead of all or part of the di-octyl phthalate such plasticizers may be used as butyl benzyl phthalate, di-butyl phthalate, di-octyl adipate, di-decyl adipate, and the like.

The ratio of ketone to aromatic solvent mixture may be ketone (e.g. acetone) 40 to 100 percent, aromatic solvent 20 to 60 percent. The types of ketones within the purview of the invention include, among others, acetone, methyl ethyl ketone, methyl isobutyl ketone and the like. Typical aromatic solvents which may optionally but preferably be used include toluene, xylene, benzene and mixtures thereof.

METHOD OF APPLICATION

The adhesive is mixed with 1 or 3 to 15 or 20 parts per 100 parts of adhesive of a polyisocyanate, preferably a polyaryl polyisocyanate such as polymethylene polyphenylisocyanate as a curing agent and applied to a board or other surface using a coating machine. The coated board is then dried in an oven at 50° to 150° C. for 3 to 10 or 20 minutes. The dried coating is reactivated with heat (e.g. 110° to 120° C.) and a vinyl chloride film or other film is applied to the hot adhesive under a pressure of about 20 to 60 psi. The laminate is then cooled and the finished product comprises a panel coated with a decorative and protective polymeric film.

Typical polyisocyanates suitable for the purposes of the present invention include, among others, 1,5-naphthalene diisocyanate, 4,4'-diphenyl diisocyanate, 4,4'-diphenylene methane diisocyanate, p-phenylene diisocyanate, 2,4-tolylene diisocyanate, 4,4',4''-triphenyl methane triisocyanate, 4,4'-tolidine diisocyanate, dianisidine diisocyanate, hexamethylene diisocyanate, 4,4'-diisocyanate of diphenyl ether, and mixtures thereof.

Typical vinyl chloride-vinyl acetate resins for solution coatings are shown in the following table:

TABLE I

| Approximate chemical Composition % by wt. | | Approx. specific gravity | Solution Properties | | |
| --- | --- | --- | --- | --- | --- |
| vinyl chloride | vinyl acetate | | approx. % by weight | solvent ratio | viscosity at 25°C. CPS. |
| 86 | 14 | 1.36 | 22 | 1/1 methyl Isobutyl Ketone/ Toluene | 250–500 |
| 86 | 14 | 1.36 | 25 | 1/2 methyl Ethyl Ketone/ Toluene | 150–200 |
| 88 | 12 | 1.37 | 30 | 1/1 methyl Isobutyl Ketone/ Toluene | 125–250 |
| 90 | 10 | 1.36 | 10 | Methyl Isobutyl Ketone | 80–150 |
| 97 | 3 | 1.39 | 8 | tetrahydrofuran | 100–150 |
| *91 | 3 | 1.39 | 20 | 1/1 methyl Isobutyl Ketone/ Toluene | 200–400 |

*5.9% by weight of hydroxyl calculated as vinyl alcohol added.

Resort may be had to modifications and variations of the disclosed embodiments without departing from the spirit of the invention or the scope of the appended claims.

What is claimed is:

1. An adhesive composition consisting of a mixture of a copolyester in which the acid units consist of 80 to 25 percent of sebacic acid units and 20 to 75 percent of terephthalic acid units and the glycol units consist of 60 to 40 percent of neopentyl glycol units and 40 to 60 percent of ethylene glycol units with 50 to (15) 150 parts per 100 part of the copolyester of a vinyl chloride-vinyl acetate copolymer which is 85 to 95 percent by weight of vinyl chloride and 15 to 5 percent by weight of vinyl acetate.

2. Adhesive composition in accordance with claim 1 in which the copolymer of vinyl chloride and vinyl acetate is present in the amount of 80 to 125 parts per 100 parts of the copolyester.

* * * * *